United States Patent [19]

Ihara et al.

[11] 4,440,074

[45] Apr. 3, 1984

[54] JUICE EXTRACTOR

[75] Inventors: Keisuke Ihara, Kasukabe; Shozi Hoshino, Sagamihara; Susumu Tanioka, Yokohama, all of Japan

[73] Assignee: Tokyo Denki Kabushiki Kaisha, Tokyo, Japan

[21] Appl. No.: 342,208

[22] Filed: Jan. 25, 1982

[51] Int. Cl.³ .............................................. A23N 1/02
[52] U.S. Cl. ...................................... 99/510; 99/495; 100/117; 100/145
[58] Field of Search ................. 99/348, 483, 495, 509, 99/510, 513; 100/117, 147, 145, 148; 425/207, 208, 209, 198; 241/260.1; 366/81, 88–90, 318, 319, 322–324; 210/173, 174, 405, 450

[56] References Cited

U.S. PATENT DOCUMENTS

| | | | |
|---|---|---|---|
| 797,374 | 8/1905 | Roberts | 100/117 |
| 1,856,835 | 5/1932 | Hays | 99/511 X |
| 2,109,398 | 2/1938 | McNitt | 99/513 X |
| 2,315,028 | 3/1943 | Thomas | 99/513 |
| 2,864,419 | 12/1958 | Woock | 99/513 |

*Primary Examiner*—Timothy F. Simone
*Attorney, Agent, or Firm*—James E. Nilles

[57] ABSTRACT

Juice extractor comprising a rotary body having a rotary shaft supported therein in such a manner that the shaft can be rotated and axially moved, and a cover adapted to be screwed to a juice extractor body, the shaft being rotatable with the cover screwed to the juice extractor body, the shaft and cover being combined and rotated together when the latter is loosened, the rotary body being able to be drawn out easily from the juice extractor body.

5 Claims, 10 Drawing Figures

JUICE EXTRACTOR

BACKGROUND OF THE INVENTION

1. Field of the Invention:

This invention relates to a juice extractor, and more particularly to a juice extractor having a spirally-ridged rotor body that rotates coaxially in a substantially cylindrical juice extractor body to cut and mash material inserted into an inlet port of the juice extractor body, characterized in that the spirally-ridged rotor body is capable of being drawn out easily from the juice extractor body.

2. Description of the Prior Art:

A juice extractor that has recently been proposed comprises an elongated rotor body that rotates on a horizontal axis in a coaxial elongated juice extractor body. At least one of the two bodies is frustoconical, so that the annular space between them tapers in a forward direction. Material is fed into an inlet port in the top of the extractor body, near its rear end, and as the rotor body rotates, a spiral fin on its exterior drives the material forwardly. The portion of this fin that is near the inlet port is formed as a blade that cuts up the material, and the fin continues forwardly as a forcing screw whereby the cut material is driven between the forwardly converging surfaces of the extractor body and the rotor body to have the juice squeezed out of it. The juice issues from a discharge port in the bottom of the extractor body, and the residual pulp passes out of a residue outlet in the extractor body that is also at its front end but is at a substantially higher level than the juice discharge port. When the rotation of the rotor body in this type of juice extractor is stopped while it is in use, fractions of the material cut by the rotor body are wedged into the space between the outer surface of the rotor body and the inner surface of the juice extractor body. This would make it difficult or impossible to draw out the rotor body from the juice extractor body.

SUMMARY OF THE INVENTION

The present invention has as its general object to eliminate the above-mentioned drawbacks encountered in the conventional juice extractor. An object of the present invention is to provide a juice extractor comprising a more or less cylindrical extractor body having a closed front end and an open rear end, a cover whereby the rear end of the extractor body is closed and which has a threaded connection with the extractor body, a more or less cylindrical rotor body that rotates coaxially in the extractor body and cooperates with it to define an annular forwardly tapering crushing chamber, said rotor body having a spiral fin extending along its length whereby material is moved forwardly in the crushing chamber by rotation of the rotor body in one direction and having a shaft extending coaxially therethrough and anchored therein, said shaft having a rear end portion that projects through and beyond the cover to have a splined connection with a mechanism that drives the rotor body for rotation in said one direction, and cooperating means on the cover and on the rotor body for enabling the cover to be used to turn the rotor body in the opposite direction, so that material in the crushing chamber is driven rearwardly out of wedging engagement with the two bodies and the rotor body is thus freed for easy withdrawal from the extractor body.

In one embodiment of the invention the shaft and the cover are formed for cooperation whereby the rotor body is constrained to rotate with the cover as the cover is unscrewed from the extractor body and whereby the cover remains securely but readily detachably connected with the rotor body after the cover is completely disengaged from the extractor body, so that the cover can be used for pulling the rotor body axially out of the extractor body.

In another embodiment of the invention the cover and the rotor body are so configured that when the cover is removed from the extractor body and turned end-for-end it serves as a convenient tool by which the rotor body can be rotated in the reverse of its operating direction.

In general, therefore, the object of this invention is to provide a juice extractor of the character described wherein the rotor body can be very readily withdrawn from the extractor body to facilitate cleaning of both of those bodies.

With the arrangement of this invention, the rotor body can be drawn out easily with smaller force from the juice extractor as compared with a case in which the rotary shaft, which has a small diameter, and which is therefore hard to grip, is merely drawn out axially from the juice extractor body. This allows the operation efficiency of the juice extractor to be improved.

DESCRIPTION OF THE PREFERRED EMBODIMENTS

The construction of an embodiment of the present invention will now be described with reference to the accompanying drawings.

Figure 1:
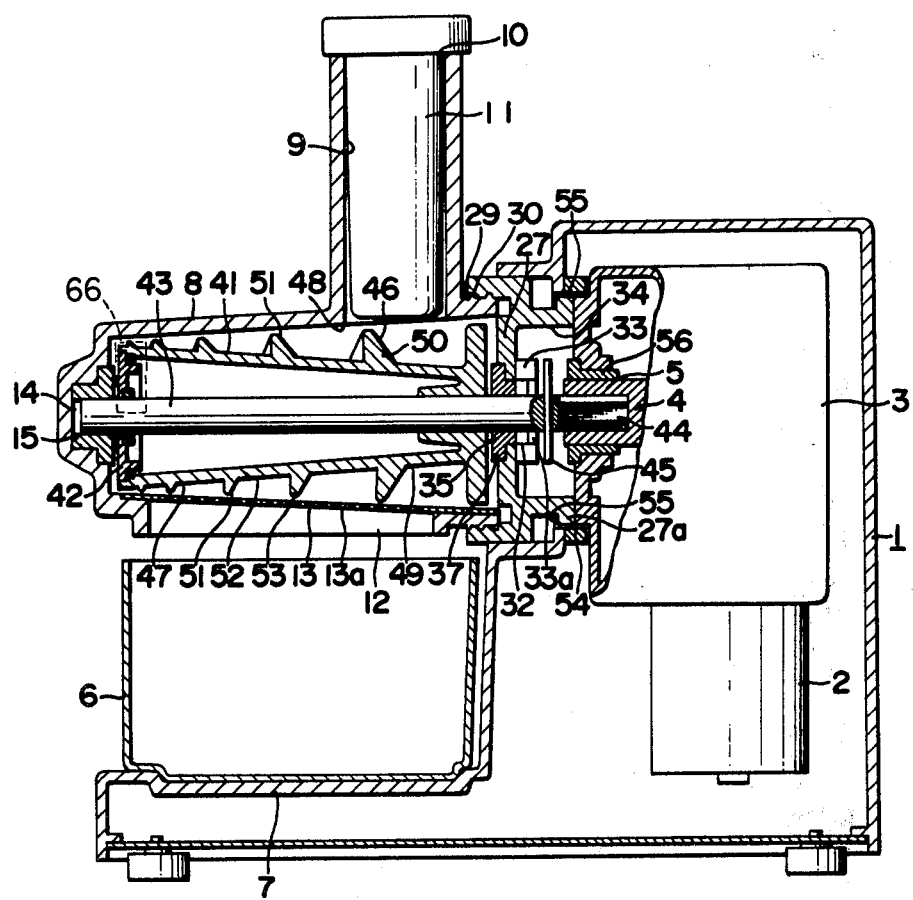
FIG. 1 is a vertical sectional view illustrating an embodiment of a juice extractor according to the present invention.

Referring to FIG. 1, reference numeral 1 denotes a juice extractor base wherein there is an electric motor 2. A reduction gear transmission mechanism 3 is connected to an output side of the electric motor and has a coopling socket 5 in its output shaft 4.

A seat 7 for a juice receptacle 6 is provided at a lower portion of one side of the juice extractor base 1.

Reference numeral 8 denotes a more or less cylindrical juice extractor body of synthetic resin, the inner diameter of which decreases gradually toward the front end thereof. The juice extractor body 8 has a closed front end and has an open rear end that is normally closed by a cover 27. It is adapted to be installed on the base 1 with its axis horizontal and its rear end adjacent to the transmission mechanism 3. A cylindrical inlet port 9 through which material to be treated is fed into the juice extractor body is formed on the top of it near its rear end. A push bar 11 for use in pressing the material is inserted into the inlet port 9 from an opening 10 at an upper end thereof.

The push bar 11 has a press-controlling portion 11a at its upper end and an arcuate pressing surface 11b at its lower end.

A juice discharge port 12 is formed in the lower portion of the circumferential wall of the juice extractor body 8, which discharge port 12 extends from near the front end to near the rear end of the juice extractor body. An arcuate plate type filter 13 having a plurality of small bores 13a therethrough is detachably installed in the juice discharge port 12, the inner surface of the filter 13 being substantially flush with the inner surface of the juice extractor body 8.

The juice extractor body 8 is also provided with a residue discharge port 66 in its side wall, near its front end and at a level substantially above the juice discharge port 12.

A coaxial bearing-holding recess 14 is provided in the front end of the juice extractor body 8, and a bearing 15 molded out of a metal or a synthetic resin is fitted firmly in the recess 14.

Figure 4:
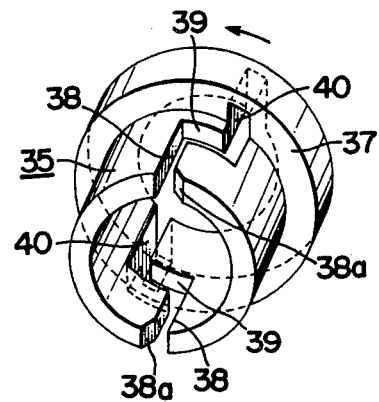
FIG. 4 is a perspective view of the bearing in the embodiment.
Figure 5:
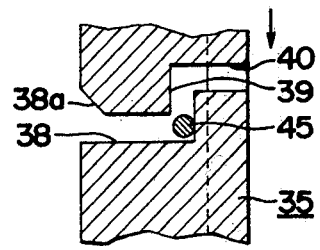
FIG. 5 is a fragmentary sectional view through the bearing.
Figure 6:
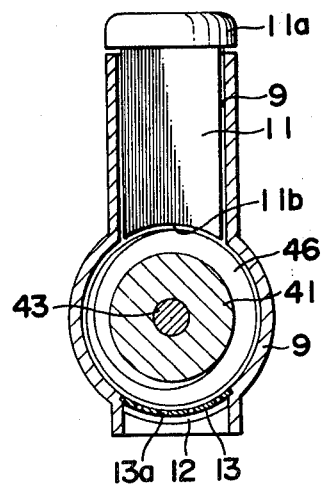
FIG. 6 is a view in longitudinal section through the inlet port of the juice extractor body, taken on a plane normal to the shaft axis.
Figure 7:
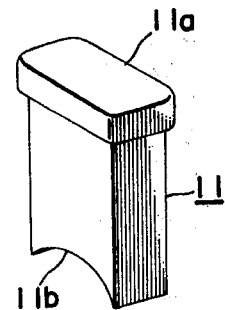
FIG. 7 is a perspective view of a push bar in the embodiment.

A male screw thread 29 is formed on the outer circumferential surface of the rear end portion of the juice extractor body 8, and the cover 27 that closes the open rear end of the juice extractor body has at the circumference thereof a fitting portion 31 provided with a female screw thread 30 to be engaged with said male screw 29. The cover 27 is formed with a coaxial rearwardly projecting boss and has a coaxial bore 32 through it that has an enlarged diameter portion 36 at its front end. A shaft supporting bearing 35 is snugly received in the bore 32 and has a circumferential flange 37 around its front end that fits closely in the enlarged diameter front portion 36 of the bore. The cover 27 is also formed with a coaxial rearwardly projecting annular fitting portion 34 that has radially outwardly projecting bayonet lugs 27a at its rear end for detachable connection of the cover to the machine base 1. The bearing 35, which is shown in FIG. 4, is of synthetic resin or metal. Opening radially through the cylindrical rear portion of the bearing 35 and to its rear end are diametrically opposite axially extending slots 38 that register with and open radially outwardly to slots 33 in the boss portion of the cover 27. The slots 38 extend only partway forwardly through the bearing 35, and each opens at its front end to one end of a circumferentially extending slot 39 in the bearing (see FIG. 4). Again, the cover 27 has circumferentially extending slots to which its slots 33 open at their front ends and which are in register with the circumferential slots 39 in the bearing. Each of the circumferential slots 39, at its end remote from the rearwardly opening slot 38, communicates with a forwardly extending slot 40 that opens to the front face of the bearing 35. The forwardly opening slots 40 are displaced circumferentially from the rearwardly opening slots 38 in the opposite direction from that in which the cover is turned when it is screwed onto the juice extractor body 8.

Inclined locking guide edges 33a, 38a are formed at the rear end of each of the slots 33, 38, that is on the upstream side with respect to the direction in which the cover 27 is screwed to the juice extractor body 8.

Reference numeral 41 denotes a rotor body consisting of a hollow cylindrical structure, the diameter of which increases gradually toward the front end thereof. A shaft 43, which extends coaxially through the rotor body 41, has its front end portion projecting outward from an end plate 42, with which a front open end of the rotor body 41 is closed, and projects rearwardly beyond a rear end wall of the rotor body, in which the shaft is anchored. The ends of the shaft 43 are supported rotatably and axially moved in the bearings 15, 35. The rear end of the rotary shaft 43 which projects from the bearing 35 is provided with a noncircular cross-section defining a spline coupling 44, which can be axially engaged with and disengaged from the coupling 5 of the previously-mentioned output shaft 4. That end portion of the rotary shaft 43 is also provided with a cross pin that defines locking projections 45, which are slidable in the above-mentioned slots 33, 38. The locking projections 45 are formed to such a length that allows the locking projections 45 to be moved forwardly through the slots 33, 38, then circumferentially in the slots 39, then forwardly through the slots 40 and out of the cover 27.

Figure 3:
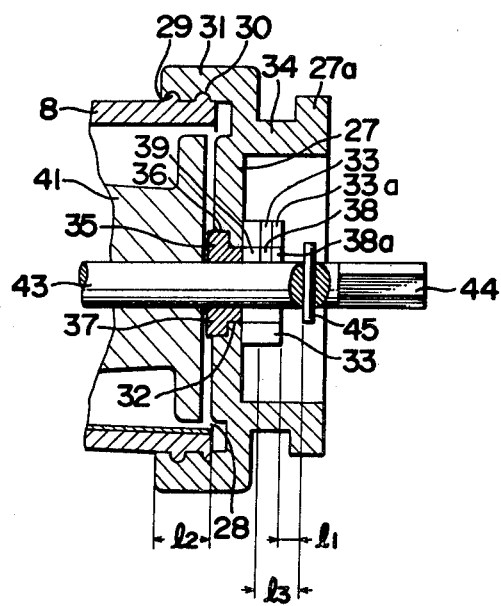
FIG. 3 is a fragmentary sectional view of screw-connected portions of the cover and the juice extractor body in the embodiment.

The distance $l_2$ through which the rotary shaft 43 can be moved in the axial direction to bring the locking projections 45 from their normal operative positions (shown in FIG. 3) to the rear ends of the slots 33 is smaller than the axial distance $l_2$ through which the male screw 29 on the juice extractor body 8 and the female screw 30 in the cover 27 are engaged with each other. Also, the distance $l_3$ through which the rotary shaft 43 is moved from its normal position to a position in which the locking projections are at the inner end portions of the slits 33, 38, is smaller than the axial distance $l_2$ through which the juice extractor body 8 and cover 27 are threadedly connected to each other. The above relation is expressed by the following formula:

$$L_2 > L_3 > L_1$$

The rotor body 41 has on the outer circumferential surface thereof a spiral fin 51 with a cutting blade portion 46 and a pressing portion 47. The cutting blade portion 46 is adjacent to the inlet port 9 of the juice extractor body 8, and material inserted into the inlet port 9 is cut by the cutting blade portion 46 in connection with an edge 48 on the juice extractor body 8, around the inlet port 9. The pressing portion 47 of the spiral fin 51 is continuous with the cutting blade portion 46, so that the material to be cut and smashed can be moved in the forward direction as the rotor body 41 is rotated in one direction. The pitch of the fin 5 in the cutting blade portion 46 and in the pressing portion 47 decreases gradually toward the front end of the rotor body 41.

The clearance between the outer circumferential edges of the spiral fin 51 and the inner circumferential surface of the juice extractor body 8 is maintained at a low and constant level.

Reference numeral 54 denotes a clamp case secured to one side of the base 1 previously mentioned. The bayonet lugs 27a on the cylindrical fitting portion 34 of the cover are adapted to be engaged with and disengaged from locking claws 55 formed on the clamp case 54. When the cover 27 is screwed to the extractor body 8 and the cover is connected with the clamp case 54, the spline coupling 44 of the rotary shaft 43 is engaged with the coupling 5 of the output shaft 4, which is supported on the base 1 via the bearing 56, in the central portion of the clamp case 54.

The operation of the above embodiment will be described.

Figure 2:
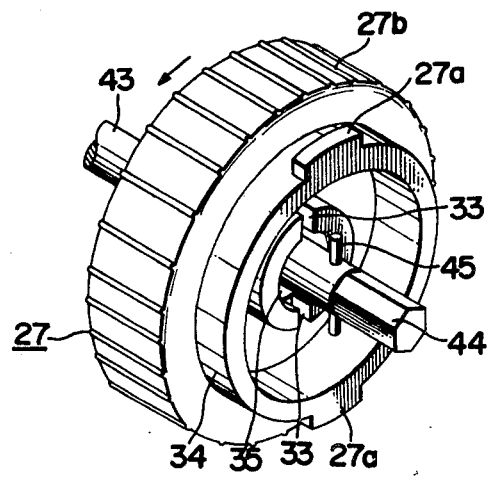
FIG. 2 is a perspective view of the cover in the embodiment.

The rotary shaft 43 is inserted into the bearing 35 in the cover 27 as the locking projections 45 of the former are inserted through the slots 40 formed in the latter. When the locking projections 45 have reached the circumferential slots 39, which extend from the inner ends of the slots 40, the shaft 43 is rotated to bring the locking projections 45 to the slots 33, 38, and the rotary shaft 43 is further inserted into the bearing 35. The cover is then screwed onto the extractor body, and note that for installation it is rotated in the direction designated by the arrows in FIGS. 2 and 4. As a result, the locking projections 45 come out of the slots 33, 38, and the rotary shaft 43 projects substantially beyond the rear end of the bearing 35. When the female screw 30 formed in the cover 27 is fully engaged with the male screw 29 formed on the juice extractor body 8, to thereby close the opening 28, the rotary shaft 43 is supported on the bearings 15, 35, and the locking projections 45 thereof are behind the bearing 35. The cylindrical fitting portion 34 of the cover 27 is then fitted into the clamp case 54 to engage the bayonet lugs 27a with the clamp locking claw 55, so that the juice extractor body 8 is supported horizontally on the base 1. At the same time, the spline 44 of the rotary shaft 43 is coupled with the coupling 5 of the output shaft 4.

When a switch (not shown) is then closed to drive an electric motor 2, the output shaft 4 in the reduction gear transmission mechanism 3 is rotated. Consequently, the shaft 43 is rotated via the engaged couplings 5, 44 to cause the rotor body 41 to be rotated.

Material to be cut and smashed is inserted into the inlet port 9 and compressed with the push bar 11. Since the pressing surface 11b of the push bar 11 is formed arcuately in conformity with the shape of the outer surface of the cutting blade portion 46 of the rotor body 41, the material can be compressed stably with the cutting blade portion 46 of the rotor body 41. In other words, the material is not shaken by the rotation of the rotor body, nor is it moved loosely. The material is moved towards the front end of the rotary body 41 by the spiral cutting blade portion 46 as it is cut with the cutting blade portion 46 and the open edge portion of the inlet port 9. Thus, the cut material is sent to the pressing portion 47 of the spiral fin 51 which is continuous with the spiral cutting blade portion 46. In the pressing portion 47, the radial dimension of the spiral fin 51 decreases gradually toward the front end of the rotor body 41. Accordingly, the material is smashed and pressed between the inner surface of the juice extractor body 8 and the circumferential surface 52 of the rotor body, and the extracted liquid drops into the juice receptacle 6 through the small bores 13a in the filter 13 in the juice discharge port 12.

The residue of the material is not transferred to the front end of the juice extractor body 8 but passes out of the residue outlet 66.

In order to wash the parts of the juice extractor after a juice extracting operation has been completed, a knurled grip 27b formed on the outer circumferential portion of the cover 27 is held by the hand to remove the cover 27 from the clamp case 54 on the base 1. The cover 27 is then turned with respect to the juice extractor body 8 to unscrew it from that body in the direction opposite to the arrow in FIG. 2 such that the cover 27 moves axially rearwardly relative to the juice extractor body 8. When the slots 33 in the cover 27 have reached the locking projections 45 on the rotary shaft 43, the locking projections 45 come into engagement with the slots 33 along the locking guide edges 33a. When the cover 27 is further loosened, the locking projections 45 fully enter the slots 38 in the bearing 35, and the rotary shaft 43 is therefore rotated with the cover 27 relative to the extracted body 8. This rotational force is also transmitted to the rotor body 41, so that, when fractions of cut material are wedged between the outer circumferential surface of the rotor body 41 and the inner circumferential surface of the juice extractor body 8, they are moved rearward and thus loosened. When the cover 27 is further loosened, the locking projections 45 reach the front ends of the slots 33, 38, and the rotary shaft 43 is drawn outward as it is rotated. When the cover 27 is fully disengaged from the juice extractor body 8, the rotary body 41 can be drawn axially all the way out of the juice extractor body 8 by means of the cover.

When the cover 27 is thereafter rotated in the opposite direction relative to the rotor body 41 the locking projections 45 move along the circumferentially extending slots 39 to the inner ends of the forwardly opening slots 40, whereupon the locking projections can be moved forwardly in those slots 40 as the shaft 43 is separated from the cover 27. The extractor body 8, rotary body 41 and cover 27 are then washed.

In the above embodiment, the slot 39 and 40 are formed in the cover 27 and bearng 37 to allow the rotary shaft 43 to be drawn out with the locking projections 45 held perpendicularly thereon. This embodiment may be modified in such a manner that the locking projections 45 are detachably provided on the rotary shaft 43 without forming the slots 39, 40.

Figure 8:
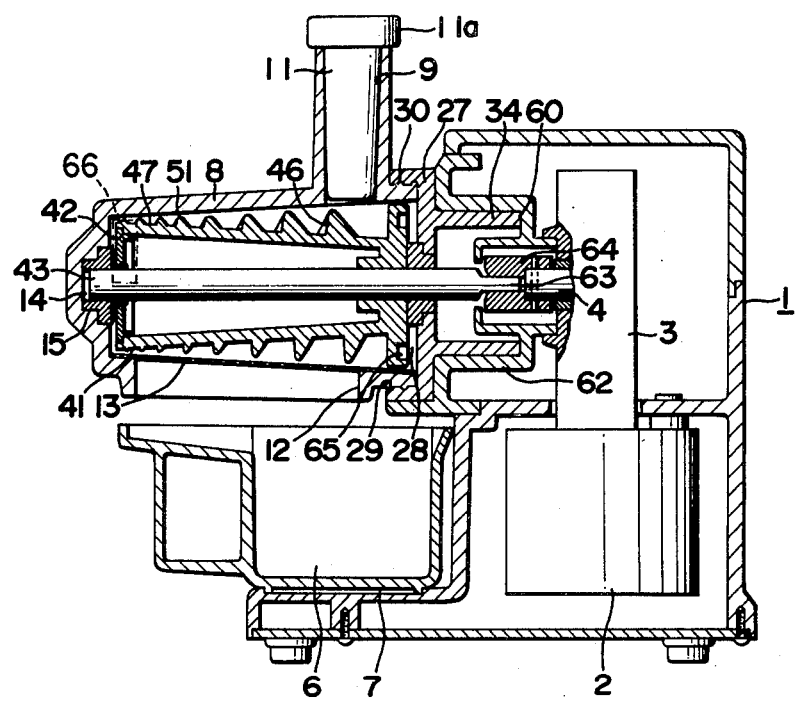
FIG. 8 is a view in longitudinal section of another embodiment of the present invention.
Figure 9:
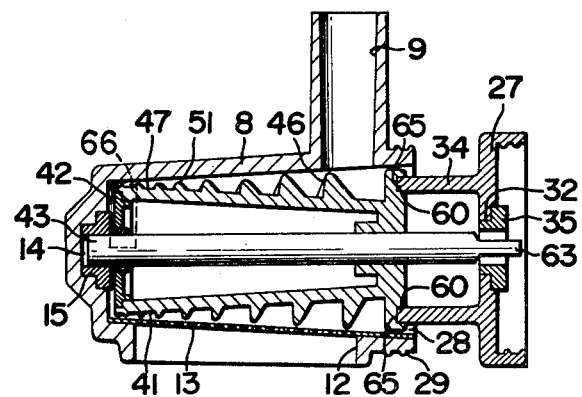
FIG. 9 is a view in longitudinal section illustrating the rotor body being rotated by means of the cover in the second embodiment.
Figure 10:
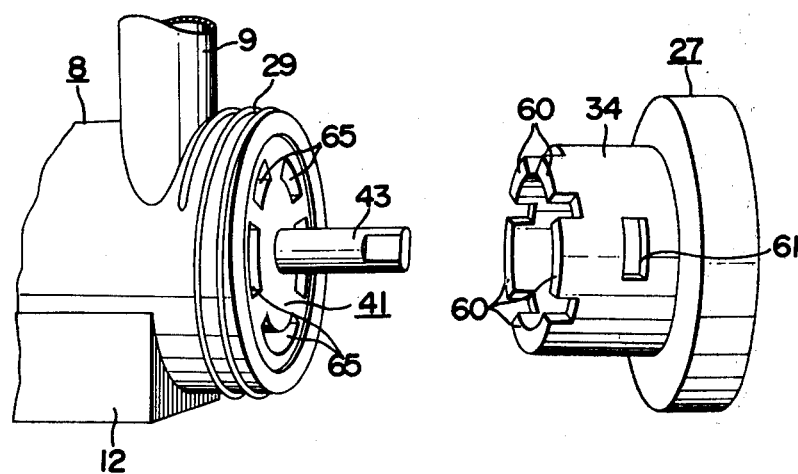
FIG. 10 is a perspective view of the principal portions of the cover and rotor body in the second embodiment.

The construction of another embodiment will be described with reference to FIGS. 8–10.

In this embodiment, there is a coaxial fitting cylinder 34 that projects from the outer end surface of the cover 27, which is provided at the free end portion thereof with a plurality of locking and operating projections 60.

The fitting cylinder 34 has in the circumferential wall thereof clamp locking bores 61 that are detachably engaging by locking claws of a clamp case 62 on the base 1. A coupling 63 on the rotary shaft 43 that extends through the rotor body 41 is engaged with a coupling 64 on the output shaft 4.

A plurality of locking recesses 65 are formed in the outer surface of a base end of the spirally-ridged rotor body 41, which is coaxially rotatable in the juice extractor body 8.

The rotary body 41 is inserted into the juice extractor body 8, and the female screw 30 in the cover 27 is then brought into engagement with the male screw 29 on the juice extractor body 8 to close the opening 28 at the rear end of the juice extractor body 8. Thus, the rotor body 41 is rotably supported. The fitting cylinder 34 that projects from the cover 27 is then fitted into the clamp case 62 to be set firmly therein by the clamp mechanism. The coupling 63 on the rotary shaft 43 is engaged with the coupling 64 on the output shaft 4. A juice receptacle 6 is placed on a support 7 on the base 1. A material is then cut and smashed in the same manner as in the previously-described embodiment.

In order to wash the inside of the juice extractor body after it has been used, the fitting cylinder 34 that projects from the cover 27 is removed from the clamp case 62 on the base 1, and then the cover 27 is removed from the juice extractor body 8. The rotor body 41 is then pulled out from the juice extractor body 8. When fractions of the cut material are wedged between the inner surface of the juice extractor body 8 and the outer surface of the rotor body 41 to prevent the rotor body 41 from being drawn out from the juice extractor body 8, the locking and operating projections 60 on the fitting cylinder 34 are brought into engagement with the locking recesses 65 in the base end surface of the rotor body 41, and the cover 27 is gripped by the hand to turn the rotor body 41 in the direction opposite to that of its crushing rotation. As a result, the fractions of the cut material wedged in the space between the outer surface of the rotor body 41 and the inner surface of the juice extractor body 8 are removed therefrom. The rotor body 41 is thereafter drawn out.

What is claimed is:

1. A juice extractor comprising an elongated substantially cylindrical extractor body which is adapted to have its axis horizontal and which has a closed front end, an open rear end, an inlet port in its top near its rear end, and a juice outlet in its bottom, a cover for closing the rear end of the extractor body having a screw-threaded connection with the extractor body and in which there is a coaxial bore, and a substantially cylindrical rotor body coaxially rotatable in the extractor body and cooperating with the latter to define an annular chamber with forwardly convergent circumferential surfaces, said rotor body having a spiral fin whereby material fed into said inlet port is driven forwardly in said chamber during rotation of the rotor body in one direction and having a coaxial shaft extending therethrough and anchored thereto, a front end portion of said shaft being receivable in a coaxial front bearing in the front end of the extractor body and a rear end portion of said shaft being axially slidable and rotatable in said bore in the cover to project rearwardly therefrom for readily detachably connection with a drive mechanism, said juice extractor being characterized by:

cooperating abutment means on said cover and on the rotor body, disposed eccentrically to said axis but symmetrically thereto, engageable when the shaft extends through said bore and whereby the rotor body is constrained to rotate with the cover in the opposite direction, so that the cover can be used to loosen material wedged between the extractor body and the rotor body and thus free the latter for easy axial withdrawal from the extractor body.

2. The juice extractor of claim 1 wherein said bore extends through a coaxial rear bearing in the cover that supports the shaft for rotation when the cover is on the extractor body and therein said cover is rotated in said one direction for installation on the extractor body, further characterized by:
  A. said abutment means on the rotor body comprising radial projections defined by a cross-pin extending transversely through the shaft and being spaced behind said bearing when the cover is fully screwed onto the extractor body; and
  B. said abutment means on the cover being defined by diametrically opposite axially extending slots in said bearing that open radially from said bore and open to the rear end of said bearing, said slots being of a width to receive the cross-pin as the cover is screwed off of the extractor body and thereby constrain the shaft to rotate with the cover in said other direction.

3. The juice extractor of claim 2 wherein said slots extend forwardly only partway into the bearing from the rear end thereof, further characterized by:
  (1) said bearing further having opposite circumferentially extending slots opening from said bore that are intermediate the front and rear ends of the bearing, each of said circumferentially extending slots being communicated at one end with a front end of one of said axially extending slots and extending circumferentially therefrom in said other direction; and
  (2) said bearing further having other diametrically opposite axially extending slots opening radially from said bore, each communicated at a rear end thereof with the other end of one of said circumferentially extending slots and extending forwardly therefrom through the front end of the bearing.

4. The juice extractor of claim 1 wherein said rotor body has a rearwardly facing base plate at the rear end thereof, further characterized by:
  said cooperating abutment means being formed on said base plate and on the rear of the cover so that the cover must be unscrewed from the extractor body and turned end-for-end to be used for rotating the rotor body in said opposite direction.

5. The juice extractor of claim 4, further characterized by:
  (1) said abutment means on the cover comprising circumferentially spaced axially rearwardly projecting lugs on the rear of the cover, and
  (2) said abutment means on the rotor body comprising circumferentially spaced recesses in said base plate in which said lugs are engageable.

* * * * *